United States Patent [19]
Pullman

[11] Patent Number: 5,333,885
[45] Date of Patent: Aug. 2, 1994

[54] FISHING CART APPARATUS

[76] Inventor: Gene A. Pullman, 51 Boones Dr., Lothian, Md. 20711

[21] Appl. No.: 31,707

[22] Filed: Jun. 9, 1993

[51] Int. Cl.5 .......................... B62B 1/12; B62B 1/16
[52] U.S. Cl. ..................... 280/47.19; 280/47.26; 280/47.28; 280/47.315; 273/285; D34/25
[58] Field of Search ............... 280/47.18, 47.19, 47.24, 280/47.26, 47.28, 47.315, 47.33; 273/285, 309; 62/457.1; 43/54.1, 21.2; D34/24, 25, 26

[56] References Cited

U.S. PATENT DOCUMENTS

| | | | |
|---|---|---|---|
| D. 182,716 | 5/1958 | Ferguson | 280/47.26 X |
| D. 246,359 | 11/1977 | Powers et al. | D12/29 |
| 2,883,731 | 4/1959 | Wells | 280/47.26 |
| 2,893,749 | 7/1959 | Simonsen | D34/25 X |
| 3,997,181 | 12/1976 | Jaco et al. | 280/47.19 |
| 4,015,778 | 4/1977 | Chen et al. | 273/285 X |
| 4,281,843 | 8/1981 | Johnson et al. | 280/47.26 |
| 4,355,818 | 10/1982 | Watts | 280/47.19 X |
| 4,864,334 | 9/1989 | Ellis | 280/47.26 X |
| 4,916,847 | 4/1990 | Rusgo | 43/21.2 X |
| 4,939,912 | 7/1990 | Leonovich, Jr. | 62/457.1 |
| 5,013,055 | 5/1991 | Labrum | 280/47.26 X |
| 5,159,777 | 11/1992 | Gonzalez | 280/47.26 X |
| 5,203,815 | 4/1993 | Miller | 280/47.26 X |
| 5,244,220 | 9/1993 | Cortez | 280/47.26 |

FOREIGN PATENT DOCUMENTS 2561601  9/1985  France ..................... 280/47.26

Primary Examiner—Brian L. Johnson
Attorney, Agent, or Firm—E. Michael Combs

[57] ABSTRACT

A wheeled cart having a floor including an intermediate shelf and an uppermost shelf, with the uppermost shelf arranged for pivotal mounting relative to the intermediate shelf for access thereto. The side walls of the cart structure are arranged to include accessories for use in the fishing procedure, wherein the handle is arranged for removal relative to associated handle support tubes permitting the cart positionable in a horizontal second position from a first vertical position for transport of the cart.

4 Claims, 4 Drawing Sheets

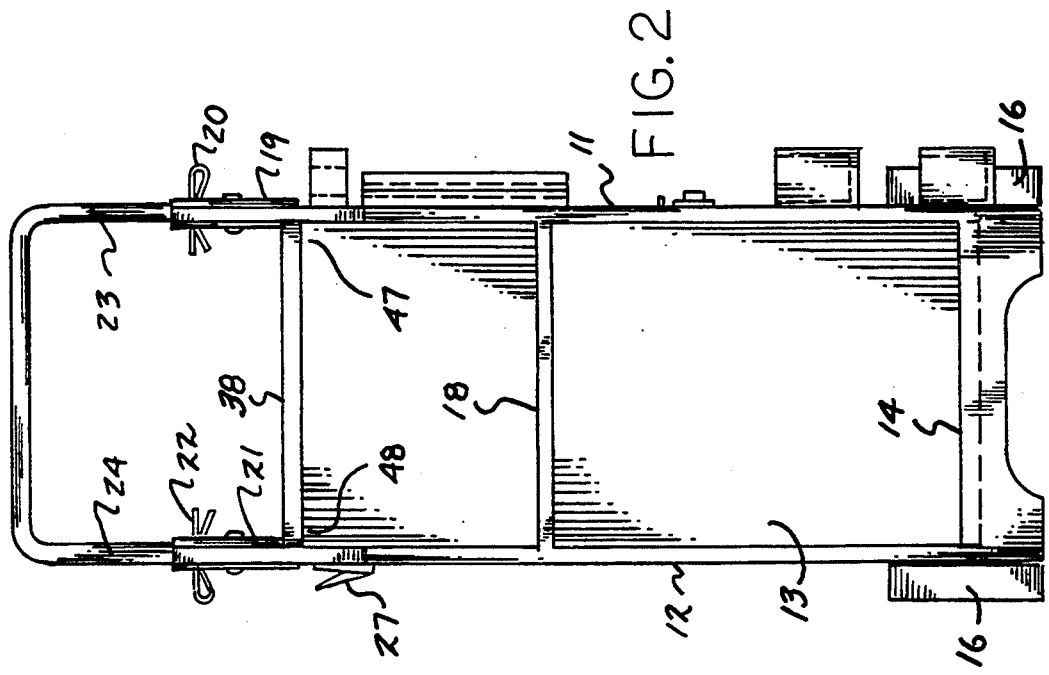
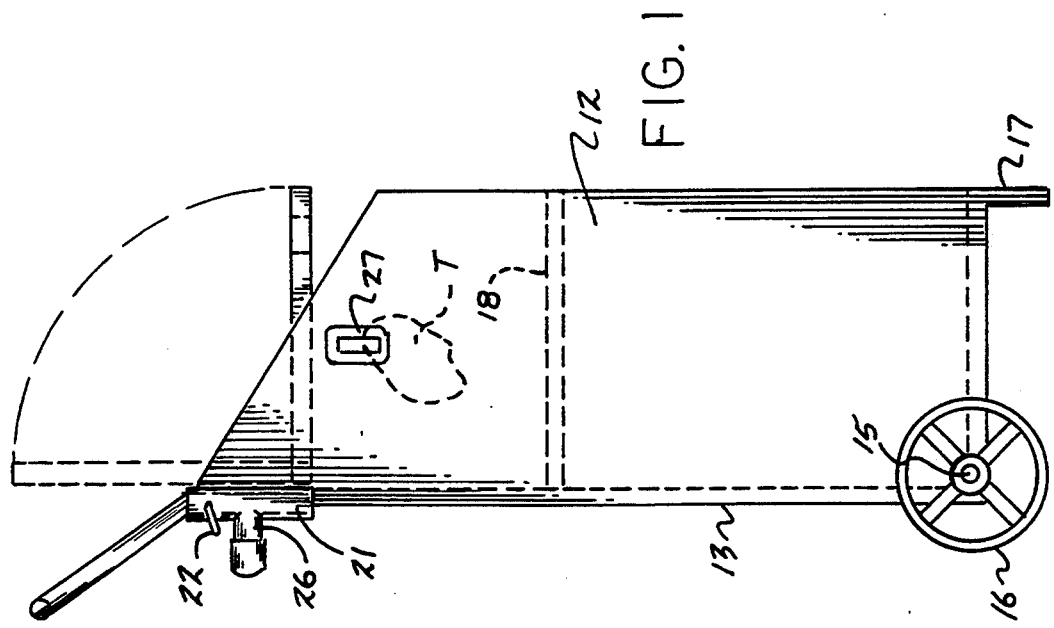

FISHING CART APPARATUS

BACKGROUND OF THE INVENTION

1. Field of the Invention

The field of invention relates to fishing apparatus, and more particularly pertains to a new and improved fishing cart apparatus arranged to support accessory structure in a fishing procedure.

2. Description of the Prior Art

Fishing apparatus of various types have been utilized throughout the prior art and exemplified in U.S. Pat. Nos. 4,355,818; 3,997,181; and U.S. Des. Pat. No. 246,359.

The instant invention attempts to overcome deficiencies of the prior art by providing for a fishing cart arranged for ease of portability from a vertical position and permitting inclination in a horizontal orientation for ease of access to the various components of the fishing cart structure and in this respect, the present invention substantially fulfills this need.

SUMMARY OF THE INVENTION

In view of the foregoing disadvantages inherent in the known types of fishing apparatus now present in the prior art, the present invention provides a fishing cart apparatus providing for a wheeled cart structure pivotal from a first vertical to a second horizontal orientation. As such, the general purpose of the present invention, which will be described subsequently in greater detail, is to provide a new and improved fishing cart apparatus which has all the advantages of the prior art fishing apparatus and none of the disadvantages.

To attain this, the present invention provides a wheeled cart having a floor including an intermediate shelf and an uppermost shelf, with the uppermost shelf arranged for pivotal mounting relative to the intermediate shelf for access thereto. The side walls of the cart structure are arranged to include accessories for use in the fishing procedure, wherein the handle is arranged for removal relative to associated handle support tubes permitting the cart positionable in a horizontal second position from a first vertical position for transport of the cart.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing cart apparatus which has all the advantages of the prior art fishing apparatus and none of the disadvantages.

It is another object of the present invention to provide a new and improved fishing cart apparatus which may be easily and efficiently manufactured and marketed.

It is a further object of the present invention to provide a new and improved fishing cart apparatus which is of a durable and reliable construction.

An even further object of the present invention is to provide a new and improved fishing cart apparatus which is susceptible of a low cost of manufacture with regard to both materials and labor, and which accordingly is then susceptible of low prices of sale to the consuming public, thereby making such fishing cart apparatus economically available to the buying public.

Still yet another object of the present invention is to provide a new and improved fishing cart apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic right side view of the invention.

FIG. 2 is an orthographic frontal view of the invention.

DESCRIPTION OF THE PREFERRED EMBODIMENT

Figure 4:
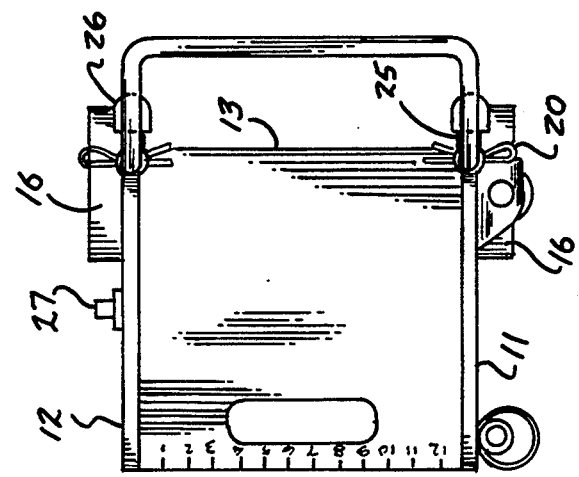
FIG. 4 is an orthographic top view of the invention, taken along the lines 4—4 of FIG. 3 in the direction indicated by the arrows.
Figure 3:
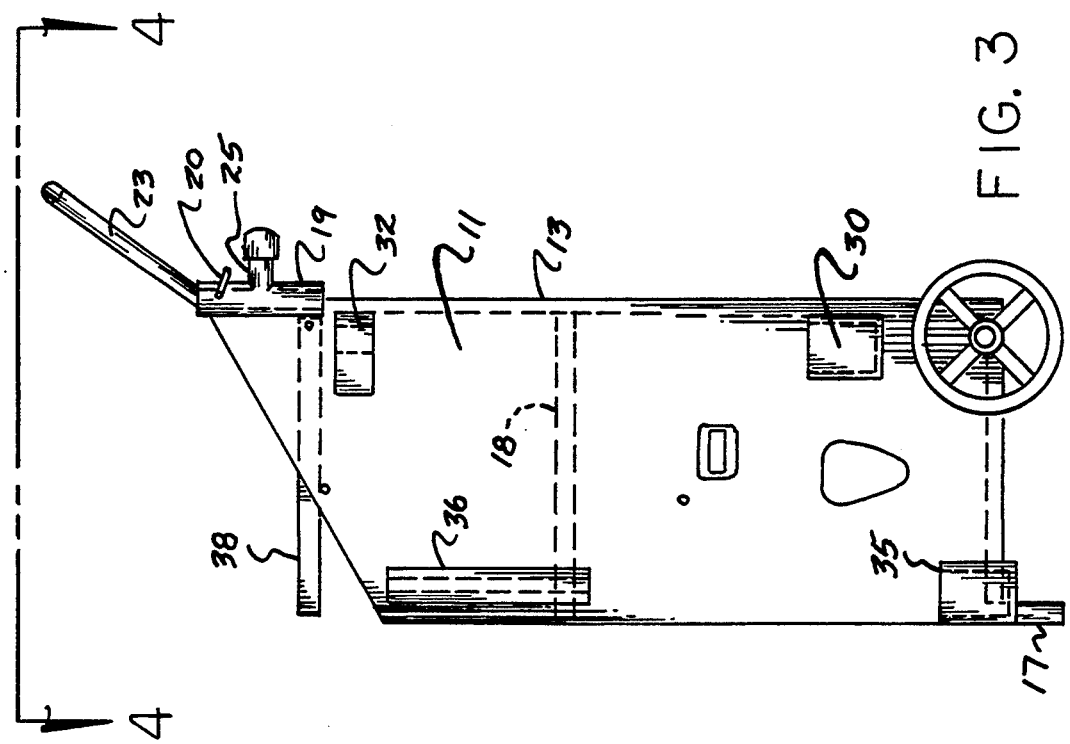
FIG. 3 is an orthographic left side view of the invention.

With reference now to the drawings, and in particular to FIGS. 1 to 6 thereof, a new and improved fishing cart apparatus embodying the principles and concepts of the present invention and generally designated by the reference numeral 10 will be described.

More specifically, the fishing cart apparatus 10 of the instant invention essentially comprises a first side wall 11 spaced from a second side wall 12 in a substantially parallel coextensive relationship, with a rear wall 13 mounted to the first and second side walls, and a floor fixedly and orthogonally mounted relative to the rear wall and the side wall, with the floor 14 intermediate the side walls. An axle 15 is orthogonally directed through the first and second side walls in adjacency to the rear wall 13 mounting a wheel member 16 to each end of the axle in adjacency relative to the respective first and second side walls 11 and 12. A positioning flange 17 is fixedly and orthogonally mounted to the floor 14 extending below the floor 14 providing for an abutment for positioning the cart structure in a vertical orientation, as indicated in FIG. 1 for example. A first shelf plate 18 is oriented parallel and coextensive relative to the floor 14 and oriented substantially intermediate the first and second side walls 11 and 12.

Figure 5:
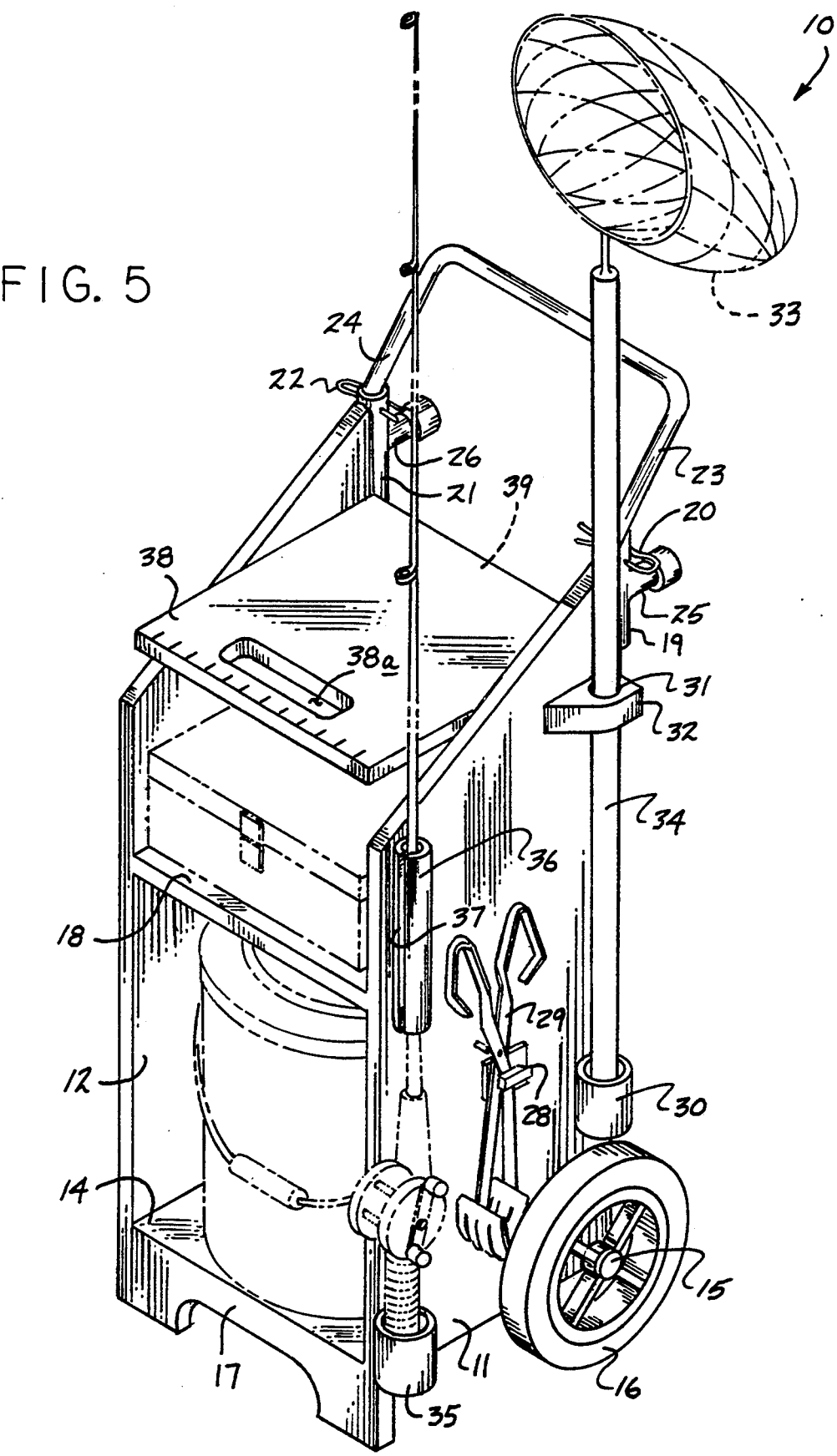
FIG. 5 is an isometric illustration of the invention.

In regards to FIG. 5, respective first and second handle tubes 19 and 21 are mounted to the respective rear edge portions of the first and second side walls 11 and 12 spaced above a second shelf plate 38 pivotally mounted about a second shelf plate axle 39 orthogonally directed between the first and second side walls 11 and 12 in adjacency to the rear wall 13. The first and second handle tubes 19 and 21 each include respective a first and second lock pin 20 and 22 directed orthogonally through the first and second handle tubes and through respective first and second U-shaped handle legs 23 and 24 that are slidably received within the first and second handle tube 19 and 21. In this manner, the U-shaped handle is arranged for removal relative to the handle tubes to permit horizontal alignment of the cart structure upon the respective first and second abutment legs 25 and 26, each having a resilient cap, with the first and second abutment legs 25 and 26 orthogonally mounted to the respective first and second handle tubes 19 and 21 projecting beyond the rear wall 13.

A spring clamp leg 27 is mounted to the second side wall 12 to support a towel or the like thereon, as indicated in phantom in FIG. 1, and designated by the letter "T". A support leg 28 arranged in a parallel spaced relationship relative to the first side wall 11 is arranged to receive a tong member pair 29 between the support leg 28 and the first side wall 11. Further, a first socket 30 is mounted to the first side wall, having a first socket bore that is coaxially aligned with a first alignment bore 31 of an alignment bore flange 32, with the alignment bore flange 32 spaced from the first socket 30 to slidably receive a fishing net handle 34 through the alignment bore 31 and received within the first socket 30, with the fish net handle 34 mounting a fish net 33 thereon. A second socket 35 spaced from a first socket is coaxially aligned with the second socket tube 36, that includes a tube slot 37 permitting reception of a fishing rod therethrough, wherein typically the fishing rod is mounting a fishing reel and as such, the slot 37 permits positioning of the fishing reel through the second socket tube 36, and wherein the second socket 35 is typically of a spring-biased configuration permitting separation and opening of the tube slot 37 to accommodate the fishing pole through the tube slot 37.

The second shelf 38 having a second shelf handle opening 38a and pivotal about the second shelf axle 39 as noted permits access to a container such as a fishing tackle container, as indicated in phantom in FIG. 5, mounted upon the first shelf plate 18. A fishing tackle bucket, as indicated in phantom in FIG. 5, is mounted upon the floor 14.

Figure 6:
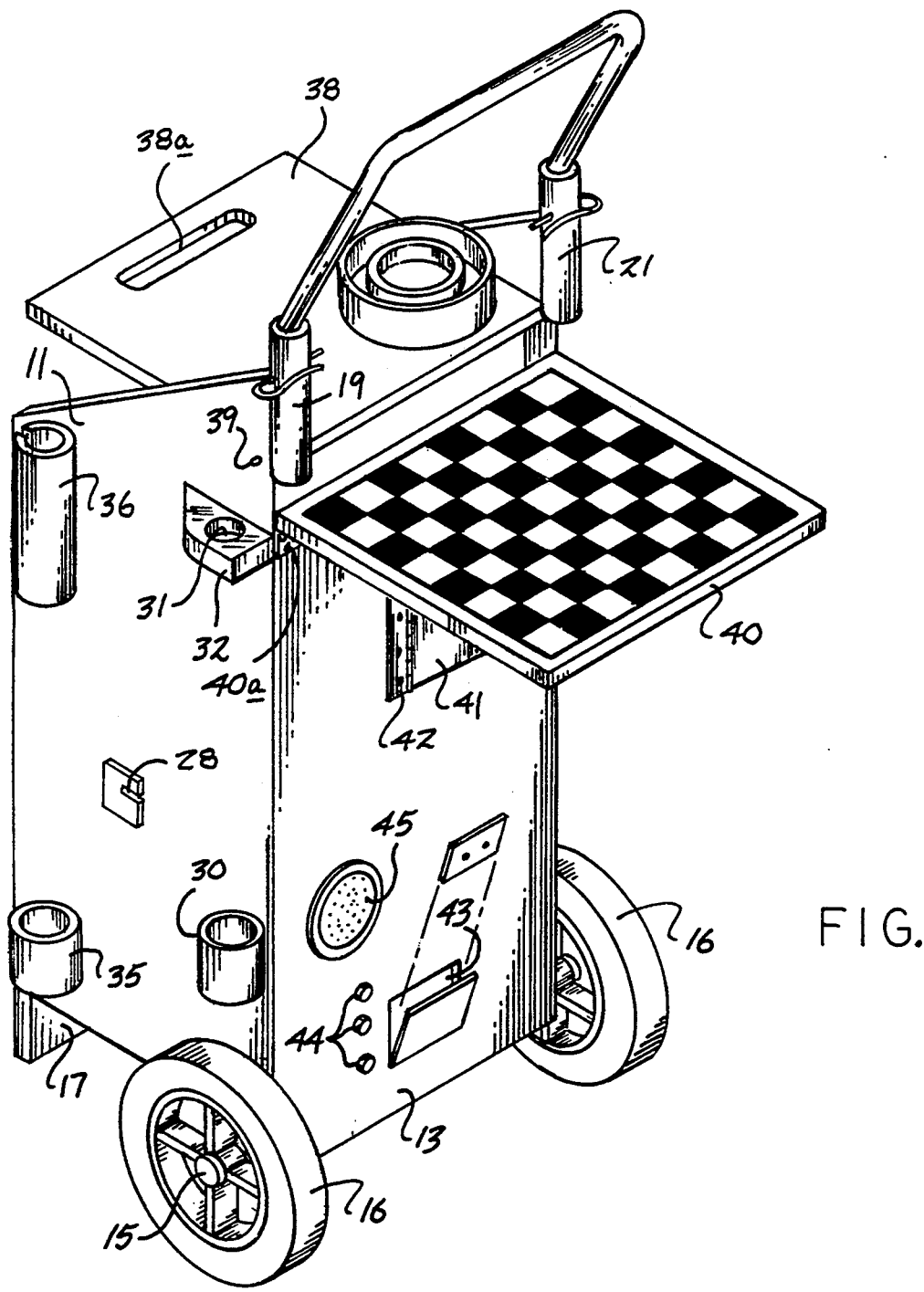
FIG. 6 is an isometric rear view of the invention.

The FIG. 6 indicates the organization further employing for entertainment and amusement during a fishing procedure, a game plate 40 hingedly mounted about a game plate hinge 40a to the rear wall 13 in adjacency to the first and second handle tubes 19 and 21. A cassette player 43 is provided operative through cassette player controls 44 and a speaker 45, as an optional feature for use by the invention. It should be further noted that support of the game plate 40 is effected by a support flange 41 hingedly mounted about a support flange hinge 42 to the rear wall 13, with a support flange hinge 42 oriented substantially orthogonally relative to the game plate hinge 40a permitting pivoting of the support flange 41 in an orthogonal relationship relative to the rear wall for underlying support of the game plate 40 during use.

It should be further noted that first and second support pegs 47 and 48 respectively are arranged in a coaxially aligned relationship orthogonally mounted to the respective first and second side walls facing one another, in a manner as indicted in FIG. 2, arranged to position and support the second shelf plate 38 while further permitting pivoting of the second shelf plate from the first and second support pegs 47 and 48 for ease of access to the underlying first shelf plate 18.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing cart apparatus, comprising,
   a first side wall spaced from and parallel to a second side wall, with the first side wall and the second side wall arranged in a coextensive relationship, and a rear wall, the first side wall and the second side wall each having a floor plate extending orthogonally between the first side wall and the second side wall, and
   a first shelf plate mounted in a spaced parallel relationship orthogonally between the first side wall and the second side wall spaced from the floor plate, and
   a second shelf plate mounted orthogonally between the first side wall and the second side wall spaced from the first shelf plate, and wherein the second shelf plate includes a second shelf plate axle pivotally mounting the second shelf plate between the first side wall and the second side wall, with the second shelf plate axle extending through the first side wall and the second side wall in an orthogonal relationship, and a wheel axle member positioned in adjacency to the floor and the rear wall and parallel to the second shelf axle, with the wheel having a plurality of wheel members rotatably mounted about the wheel axle extending beyond the floor plate, and the floor plate further including a positioning flange orthogonally mounted to the floor plate permitting support of the cart apparatus in a first vertical orientation, and the second shelf plate further includes respective first and second support pegs arranged in a coaxially aligned and facing relationship relative to one another, with the first support peg orthogonally and fixedly mounted to the first side wall, and the second support peg fixedly and orthogonally mounted to the second side wall permitting support of the second shelf plate in a parallel relationship relative to the intermediate shelf plate, and the first side wall having a first handle tube mounted to a first rear edge portion of the first side wall in adjacency to the rear wall, and the second side wall having a second handle tube fixedly mounted to a second rear edge portion of the second side wall in adjacency to the rear wall, With the first handle tube arranged parallel relative to the second handle tube in a coextensive relationship, and a U-shaped handle having a U-shaped first leg slidably received within the first handle tube, and a U-shaped handle second leg slidably received within the second handle tube, with a first lock pin directed through the first handle tube and the U-shaped handle first leg, and a second lock pin slidably received through the second handle tube and the U-shaped handle second leg permitting removal of the U-shaped handle relative to the first handle tube and the second handle tube, and a first abutment leg fixedly and orthogonally mounted to the first handle tube projecting orthogonally beyond the rear wall, and a second abutment leg fixedly and orthogonally mounted to the second handle tube projecting beyond the rear wall, with the first abutment leg and the second abutment leg arranged in a parallel coextensive relationship, and a spring clamp leg mounted to the second side wall for support of a towel member thereon, and a support leg is mounted fixedly and parallel to the first side wall in a spaced parallel relationship, and a tong member pair mounted between the support leg and the first side wall, and a first socket mounted to the first side wall in adjacency to the floor plate, and an alignment bore flange orthogonally mounted to the first side wall spaced from the first socket, with the alignment bore flange having an alignment bore directed therethrough, with the alignment bore coaxially aligned with the first socket, and a fish net having a fish net handle, wherein the fish net handle is slidably received through the first alignment bore and mounted within the first socket.

2. An apparatus as set forth in claim 1 including a second socket spaced from and parallel the first socket, and a second socket tube spaced from the second socket in a coaxially aligned relationship, with the second socket tube formed of a spring-biased material having a slot, with the slot arranged for separation to receive a fishing pole through the slot when the fishing pole is directed into the second socket.

3. An apparatus as set forth in claim 2 including a game plate, having a game plate hinge, with the game plate hinge mounted to the rear wall, and a support flange, the support flange having a support flange hinge mounted to the rear wall, and the support flange orthogonally oriented relative to the game plate hinge.

4. An apparatus as set forth in claim 3 including a cassette player, mounted to the rear wall, having cassette player controls and a cassette player speaker directed through the rear wall.

* * * * *